(12) United States Patent
Zhang et al.

(10) Patent No.: US 10,209,863 B2
(45) Date of Patent: Feb. 19, 2019

(54) METHOD AND APPARATUS FOR DISPLAYING CASCADING MENU

(75) Inventors: Xiaoxin Zhang, Hangzhou (CN); Changyuan Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 93 days.

(21) Appl. No.: 12/863,374

(22) PCT Filed: Apr. 29, 2010

(86) PCT No.: PCT/US2010/032916
§ 371 (c)(1),
(2), (4) Date: Jul. 16, 2010

(87) PCT Pub. No.: WO2010/129384
PCT Pub. Date: Nov. 11, 2010

(65) Prior Publication Data
US 2012/0124523 A1    May 17, 2012

(30) Foreign Application Priority Data
May 5, 2009  (CN) .......................... 2009 1 0137538

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01); *G06F 9/451* (2018.02)

(58) Field of Classification Search
CPC . G06F 3/0482; G06F 3/04817; G06F 3/04842
(Continued)

(56) References Cited

U.S. PATENT DOCUMENTS 5,159,546 A   10/1992  Inoue et al.
5,377,317 A   12/1994  Bates et al.
(Continued)

FOREIGN PATENT DOCUMENTS

JP   05061633 A   3/1993
JP   08016349 A   1/1996
(Continued)

OTHER PUBLICATIONS

The Chinese Office Action dated Jul. 13, 2010 for Chinese patent appliction No. 200910137538.6, a counterpart foreign application of U.S. Appl. No. 12/863,374, 9 pages.
(Continued)

*Primary Examiner* — Tuyetlien T Tran
(74) *Attorney, Agent, or Firm* — Lee & Hayes, PC

(57) ABSTRACT

The present disclosure discloses a method of displaying a cascading menu that includes a plurality of submenus. The method determines a first submenu as indicated for browsing by a user based on a clicking event of the user. When an operation interface of the first submenu is in a collapsed mode, a number of submenus that are currently in an expanded mode within an operation interface of the cascading menu is counted. When the number of submenus that are currently in the expanded mode reaches a defined threshold, at least a second submenu is selected from the submenus that are currently in the expanded mode, and an operation interface of the second submenu is shrunk. The operation interface of the first submenu is expanded. Therefore, a size of the operation interface of the cascading menu will not increase as the number of the expanded submenus increases. As such, the amount of a page space occupied by the cascading menu is reduced and utilization of the page space is improved. The present disclosure further discloses a terminal apparatus.

6 Claims, 6 Drawing Sheets

(51) Int. Cl.
  *G06F 3/0484* (2013.01)
  *G06F 3/0481* (2013.01)
  *G06F 9/451* (2018.01)

(58) Field of Classification Search
  USPC .............................. 715/810, 841, 853, 854
  See application file for complete search history.

(56) References Cited

U.S. PATENT DOCUMENTS

| | | | |
|---|---|---|---|
| 5,425,140 A | | 6/1995 | Bloomfield et al. |
| 5,500,936 A | | 3/1996 | Allen et al. |
| 5,530,796 A | | 6/1996 | Wang |
| 5,619,632 A | * | 4/1997 | Lamping et al. ............. 345/441 |
| 5,689,287 A | * | 11/1997 | Mackinlay et al. .......... 345/427 |
| 6,100,889 A | * | 8/2000 | Sciammarella et al. ...... 715/815 |
| 6,801,230 B2 | | 10/2004 | Driskell |
| 6,901,555 B2 | * | 5/2005 | Hida et al. .................... 715/734 |
| 7,003,724 B2 | | 2/2006 | Newman |
| 7,434,177 B1 | | 10/2008 | Ording et al. |
| 2002/0047866 A1 | * | 4/2002 | Matsumoto et al. ......... 345/810 |
| 2004/0230916 A1 | | 11/2004 | Salvatori et al. |
| 2004/0266396 A1 | * | 12/2004 | Henry et al. ................ 455/412.1 |
| 2005/0027408 A1 | * | 2/2005 | Donoghue et al. ............. 701/11 |
| 2005/0076312 A1 | | 4/2005 | Gardner et al. |
| 2005/0289470 A1 | * | 12/2005 | Pabla et al. ................... 715/751 |
| 2006/0282792 A1 | * | 12/2006 | Berrill ........................... 715/781 |
| 2007/0006038 A1 | * | 1/2007 | Zhou ............................... 714/38 |
| 2007/0150839 A1 | | 6/2007 | Danninger |
| 2008/0062141 A1 | * | 3/2008 | Chandhri ...................... 345/173 |
| 2008/0072177 A1 | | 3/2008 | Santos et al. |
| 2008/0072250 A1 | | 3/2008 | Osorio et al. |
| 2008/0184171 A1 | * | 7/2008 | Sato et al. .................... 715/841 |
| 2009/0125845 A1 | * | 5/2009 | Lacock et al. ................ 715/841 |
| 2009/0183120 A1 | * | 7/2009 | Ording et al. ................ 715/823 |
| 2010/0060666 A1 | * | 3/2010 | Fong .................... G06F 3/0482 345/661 |
| 2010/0205547 A1 | * | 8/2010 | Boegelund et al. .......... 715/760 |
| 2010/0287494 A1 | * | 11/2010 | Ording ................. G06F 3/0481 715/790 |

FOREIGN PATENT DOCUMENTS

| | | |
|---|---|---|
| JP | 10133842 A | 5/1998 |
| JP | 10198546 A | 7/1998 |
| JP | 1139123 A | 2/1999 |
| JP | 2000314636 A | 11/2000 |
| JP | 2001359009 A | 12/2001 |
| JP | 2002500788 A | 1/2002 |
| JP | 2008191728 A | 8/2008 |
| WO | WO2007046343 A1 | 4/2007 |

OTHER PUBLICATIONS

The Extended European Search Report dated Oct. 25, 2012 for European patent application No. 10772601.0, 6 pages.
The Chinese Office Action dated Apr. 28, 2013 for Chinese patent appliction No. 200910137538.6, a counterpart foreign application of U.S. Appl. No. 12/863,374, 8 pages.
The Japanese Office Action dated Aug. 5, 2014 for Japanese patent application No. 2012-509849 a counterpart foreign application of U.S. Appl. No. 12/863,374, 7 pages.
The Chinese Rejection Decision dated Jun. 10, 2011 for Chinese patent application No. 200910137538.6, a counterpart foreign application of U.S. Appl. No. 12/863,374, 7 pages.
The Japanese Office Action dated Mar. 4, 2014 for Japanese patent application No. 2012-509849, a counterpart foreign application of U.S. Appl. No. 12/863,374, 14 pages.
Ahlstrom, "Modeling and Improving Selection in Cascading Pull-Down Menus Using Fitts Law, the Steering Law and Force Fields", 2005 CHI Conference Proceedings, Conference on Human Factors in Computing systems, ACM, NY, Apr. 2, 2005, pp. 61-70.
Bedersen, "Fisheye Menus", Proceedings of the 2000 ACM SIGCPR Conference, Chicago, IL, Apr. 4-8, 2000, Symposium on User Interface Software and Technology, New York, NY, Nov. 1, 2000, pp. 217-225.
Cockburn, et al., "Faster Cascading Menu Selections with Enlarged Activation Areas", Proceedings of Graphics Interface 2005, Victoria, British Columbia, May 9-11, 2005, Canadian Information Processing Society, Jun. 7, 2006, pp. 65-71.
The Extended European Search Report dated May 15, 2017 for European Patent Application No. 17154674.0, 9 pages.
The European Office Action dated Apr. 19, 2018 for European Patent Application No. 17154674.0, a counterpart foreign application of U.S. Appl. No. 12/863,374, 4 pages.

* cited by examiner

METHOD AND APPARATUS FOR DISPLAYING CASCADING MENU

CROSS REFERENCE TO RELATED PATENT APPLICATIONS

This application is a national stage application of international patent application PCT/US10/32916 filed Apr. 29, 2010, claiming priority from Chinese Patent Application No. 200910137538.6, filed May 5, 2009, both entitled "METHOD AND APPARATUS FOR DISPLAYING CASCADING MENU," which applications are hereby incorporated in their entirety by reference.

TECHNICAL FIELD

The present disclosure relates to computing technology and, more particularly, to a method and apparatus for displaying a cascading menu.

BACKGROUND

Existing web pages or software generally display related information to a user through a fixed-size menu interface at a user operation interface. When the length of the content in the displayed information exceeds the size of the menu interface, existing web pages or software usually either add a scroll bar or use a cascading menu to display the entire content of the information. Referring to FIG. 1, cascading menu refers to a menu selection mode of displaying multi-level content within a user operation interface.

In existing technologies, the size of each level of submenu in the cascading menu is fixed. As the number of submenu levels increases, the total length of the operation interface of the cascading menu also increases. In this way, the operation interface of the fully expanded cascading menu will occupy a large amount of page space and thus reduce the utilization of the page space. Furthermore, when the user browses back and forth among various submenus, the motion trajectory of the mouse will become longer, resulting in very poor user experience.

SUMMARY

The present disclosure describes a method and an apparatus for displaying a cascading menu in order to reduce the amount of page space occupied by the cascading menu and hence improve utilization of the page space.

A summary of the techniques disclosed by the exemplary embodiments of the present disclosure is provided below.

In one aspect, a method of displaying a cascading menu, where the cascading menu includes a plurality of submenus, is provided. The method comprises: determining a first sub menu that is indicated for browsing by a user based on a clicking event of the user; in response to determining that an operation interface of the first submenu is in a collapsed mode, counting a number of submenus that are currently in an expanded mode within an operation interface of the cascading menu; in response to determining that the number of submenus that are currently in the expanded mode reaches a defined threshold, based on a predetermined method, selecting at least a second submenu from the submenus that are currently in the expanded mode, and shrinking an operation interface of the second submenu; and expanding the operation interface of the first submenu in a sliding manner.

In another aspect, a terminal apparatus for displaying a cascading menu including a plurality of submenus is provided. The terminal apparatus comprises: a user interface unit configured to determine a first submenu that is indicated for browsing by a user based on a clicking event of the user; a determination unit configured to determine whether an operation interface of the first submenu is in a collapsed mode and to obtain a determination result; a counting unit configured to count a number of submenus that are currently in an expanded mode within an operation interface of the cascading menu, upon determining that the operation interface of the first submenu is in the collapsed mode based on the determination result; a comparison unit configured to compare the number of submenus that are currently in the expanded mode with a defined threshold and to obtain a comparison result; and a processing unit, based on a predetermined method, configured to select a second submenu from the submenus that are currently in the expanded mode, to shrink an operation interface of the second submenu, and to expand the operation interface of the first submenu in a sliding manner, upon determining that the number of submenus that are currently in the expanded mode reaches the defined threshold based on the comparison result.

The various advantages of the present disclosure are described below.

In the exemplary embodiments of the present disclosure, a terminal apparatus uses a fixed operation interface to display to a user a cascading menu that includes a plurality of submenus. When a user clicks on a certain submenu, the apparatus determines, based on the clicking of the user, a first submenu that is indicated for browsing by the user. Upon determining that the operation interface of the first submenu is in a collapsed mode, the terminal apparatus counts the number of submenus that are currently in an expanded mode within the operation interface of the cascading menu. If it is determined that the number of submenus that are currently in the expanded mode reaches a defined threshold, the terminal apparatus selects at least a second submenu from the submenus that are currently in the expanded mode, shrinks the operation interface of the second submenu, and expands the operation interface of the first submenu in a sliding manner. Therefore, the size of the operation interface of the cascading menu will not increase as the number of the expanded submenus increases. As such, the amount of page space occupied by the cascading menu is reduced and the utilization of the page space is improved. Furthermore, when the user browses the various submenus, the mouse trajectory is also prevented from ever increasing. This allows the user to browse all submenus within the fixed operation interface and achieve an operating mode of "what you see is what you get," thereby facilitating user operations and browsing, smoothing the entire process of operations and greatly improving user experience.

DETAILED DESCRIPTION

In the exemplary embodiments of the present disclosure, the size of an operation interface of a cascading menu does not increase as the number of expanded submenus increases. As such, the amount of page space occupied by the cascading menu is reduced and utilization of the page space is improved. In the exemplary embodiments of the present disclosure, when a terminal apparatus displays to a user the cascading menu that includes a plurality of submenus, the terminal apparatus determines a first submenu that is indicated for browsing by the user based on a clicking event of the user. Upon determining that an operation interface of the first submenu is in a collapsed mode, the terminal apparatus counts the number of submenus that are currently in an expanded mode within the operation interface of the cascading menu. If it is determined that the number of submenus that are currently in the expanded mode reaches a defined threshold, the terminal apparatus selects at least a second submenu from the submenus that are currently in the expanded mode, shrinks the operation interface of the second submenu, and expands the operation interface of the first submenu in a sliding manner.

In various embodiments, shrinking each level of submenu of the cascading menu is primarily achieved by adjusting a respective property parameter, such as width for example, of a respective level of submenu. Specifically, this includes: reducing a value of the property parameter, such as width, of the respective level of submenu by using a setInterval function in order to achieve a shrinking effect of the operation interface of the respective level of submenu; and stopping reducing the property parameter, such as width, of the perspective level of submenu by using a clearTimeout function when the width of the operation interface of the respective level of submenu reduces to a defined threshold.

On the other hand, the principle of expanding the operation interface of the perspective level of submenu is similar to that of shrinking the operation interface of a perspective level of submenu. The difference is that that an operation of expansion is to increase the value of the property parameter, such as width for example, of the perspective level of submenu. Further details are thus not described herein in the interest of brevity.

The preferred embodiments of the present disclosure are described in details by referring to the accompanying figures.

Figure 1:
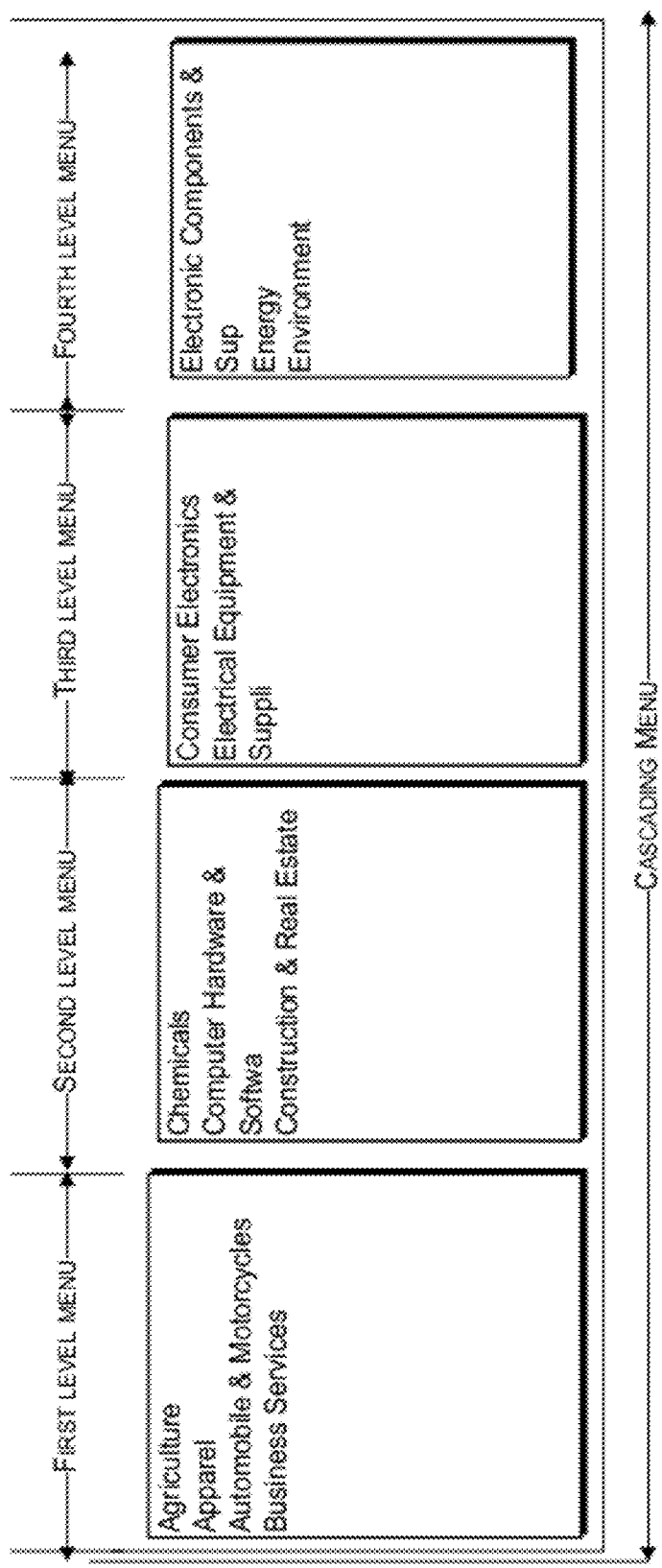
FIG. 1 shows an exemplary schematic diagram of a cascading menu under existing technology.
Figure 2:
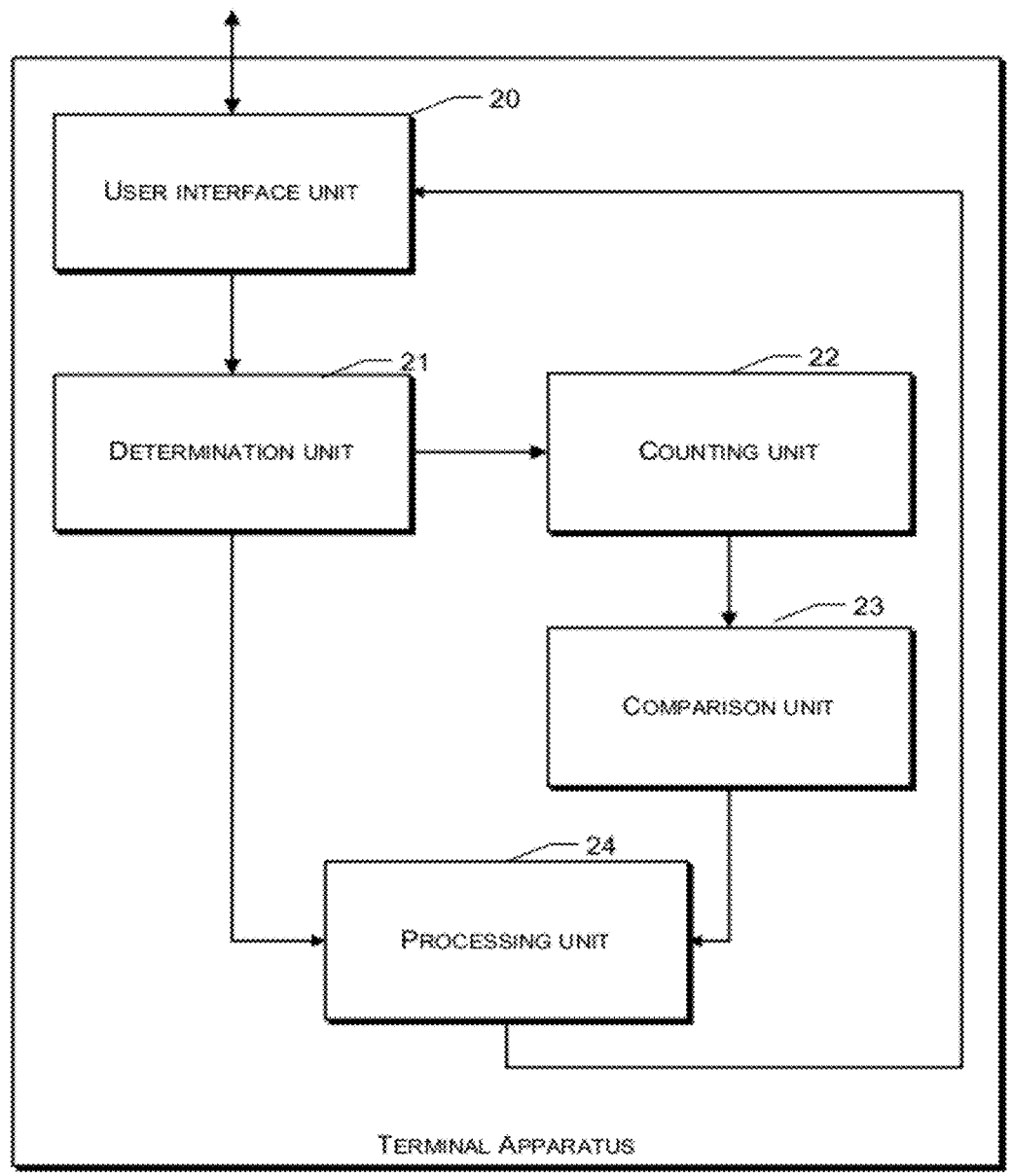
FIG. 2 shows an exemplary structural diagram of functions of a terminal apparatus in accordance with the present disclosure.

FIG. 2 shows an exemplary terminal apparatus for displaying a cascading menu to a user. The exemplary terminal apparatus includes: a user interface unit 20, a determination unit 21, a counting unit 22, a comparison unit 23 and a processing unit 24. The user interface unit 20 determines a first submenu that is indicated for browsing by the user based on a clicking event of the user. The determination unit 21 determines whether an operation interface of the first submenu is in a collapsed mode and to obtain a determination result. The counting unit 22 counts a number of submenus that are currently in an expanded mode within an operation interface of the cascading menu, when the operation interface of the first submenu is determined to be in the collapsed mode based on the determination result. The comparison unit 23 compares the number of submenus that are currently in the expanded mode with a defined threshold and obtains a comparison result. The processing unit 24, based on a predetermined method, selects at least a second submenu from the submenus that are currently in the expanded mode, shrinks an operation interface of the second submenu, and expands the operation interface of the first submenu in a sliding manner, when the number of submenus that are currently in the expanded mode is determined to reach the defined threshold based on the comparison result.

Figure 3:
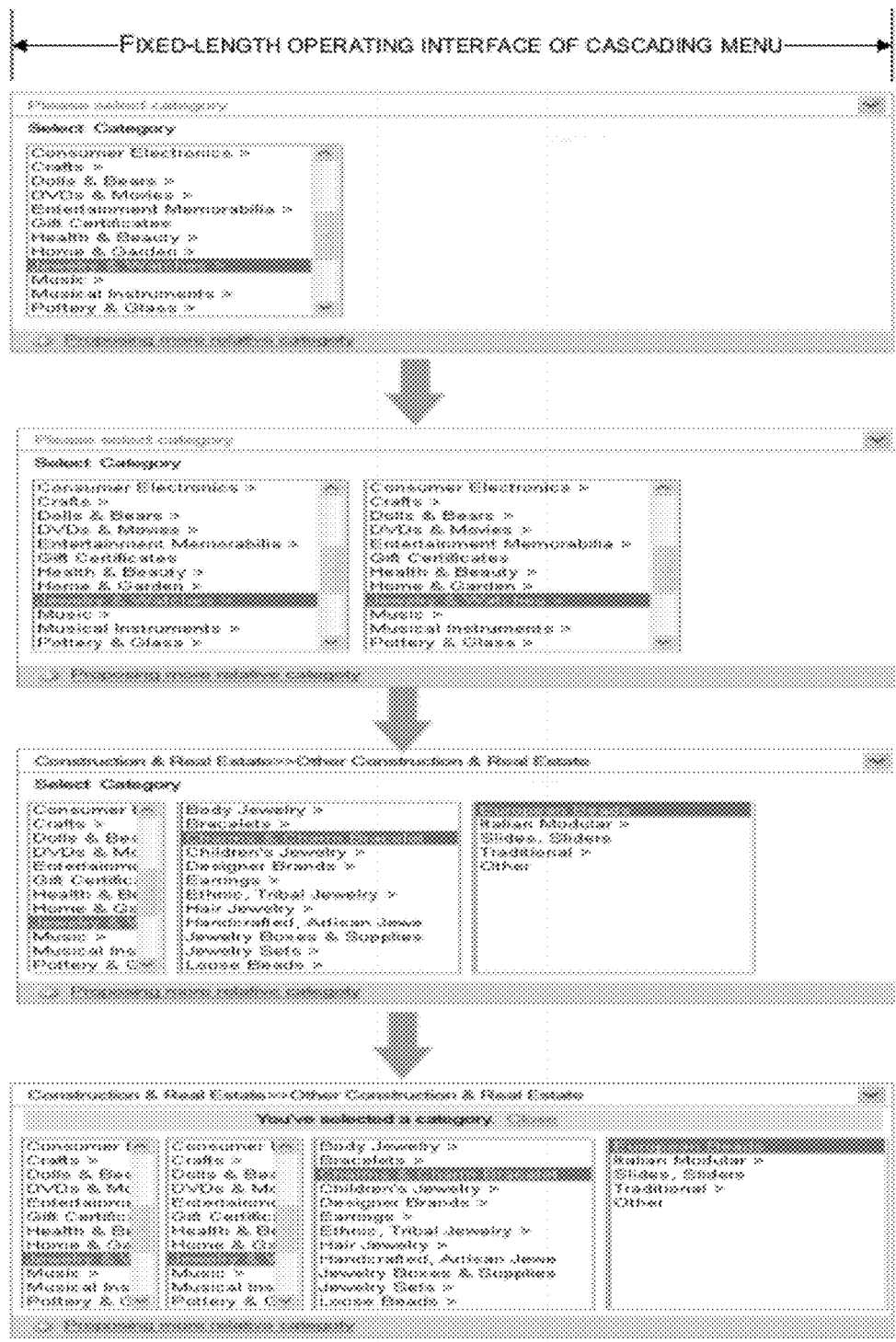
FIG. 3 shows an exemplary schematic diagram of a cascading menu in accordance with the present disclosure.

Based on the above terminal apparatus, the present embodiment allows the user to activate each level of submenu of the cascading menu in the operation interface presented by the apparatus by clicking a defined item (such as an image link or a text link) in the interface. Regardless of the number of levels of submenus that are activated, the total length of the operation interface of the cascading menu remains unchanged. The terminal apparatus adjusts the length of the operation interfaces of each level of submenu to accommodate changes of the operation interface caused by the user's selections. FIG. 3 shows an exemplary schematic diagram of operations.

Figure 4:
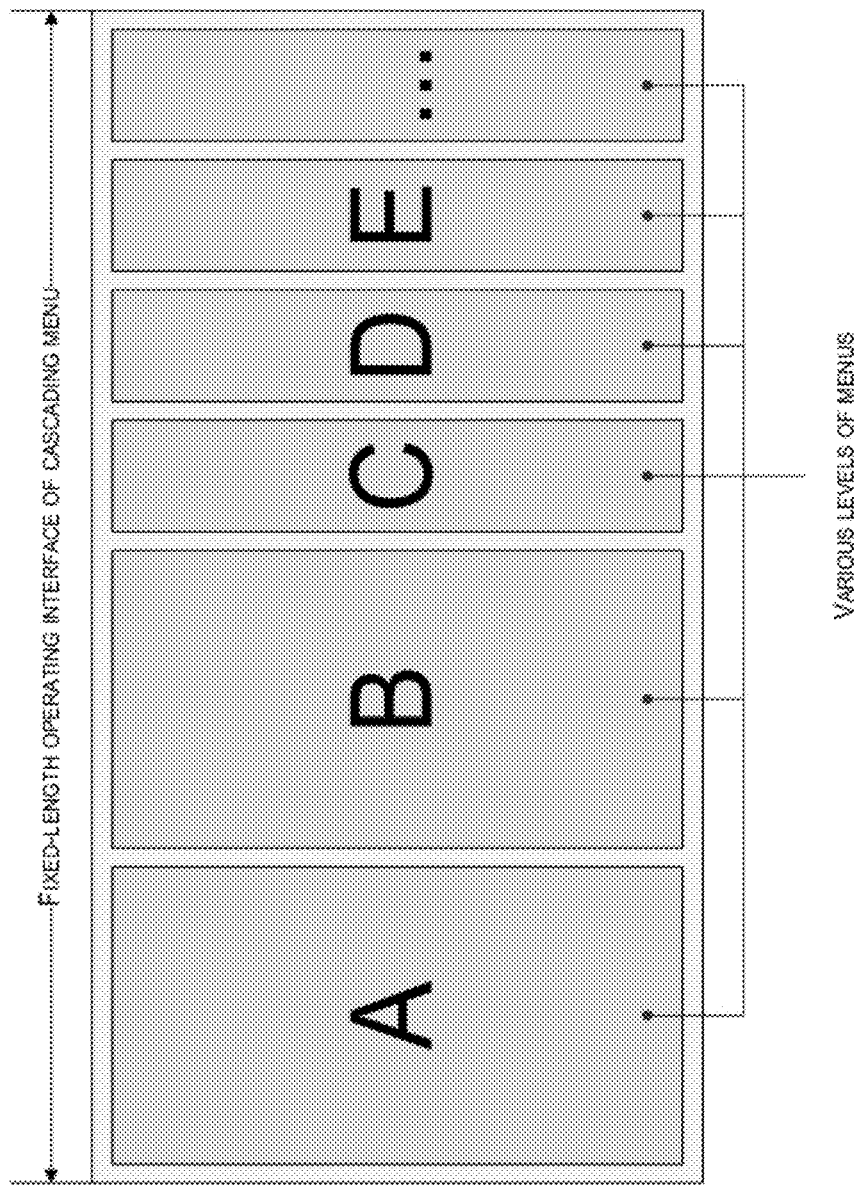
FIG. 4 shows an exemplary display of schematic diagram of displaying a cascading menu in accordance with the present disclosure.
Figure 5:
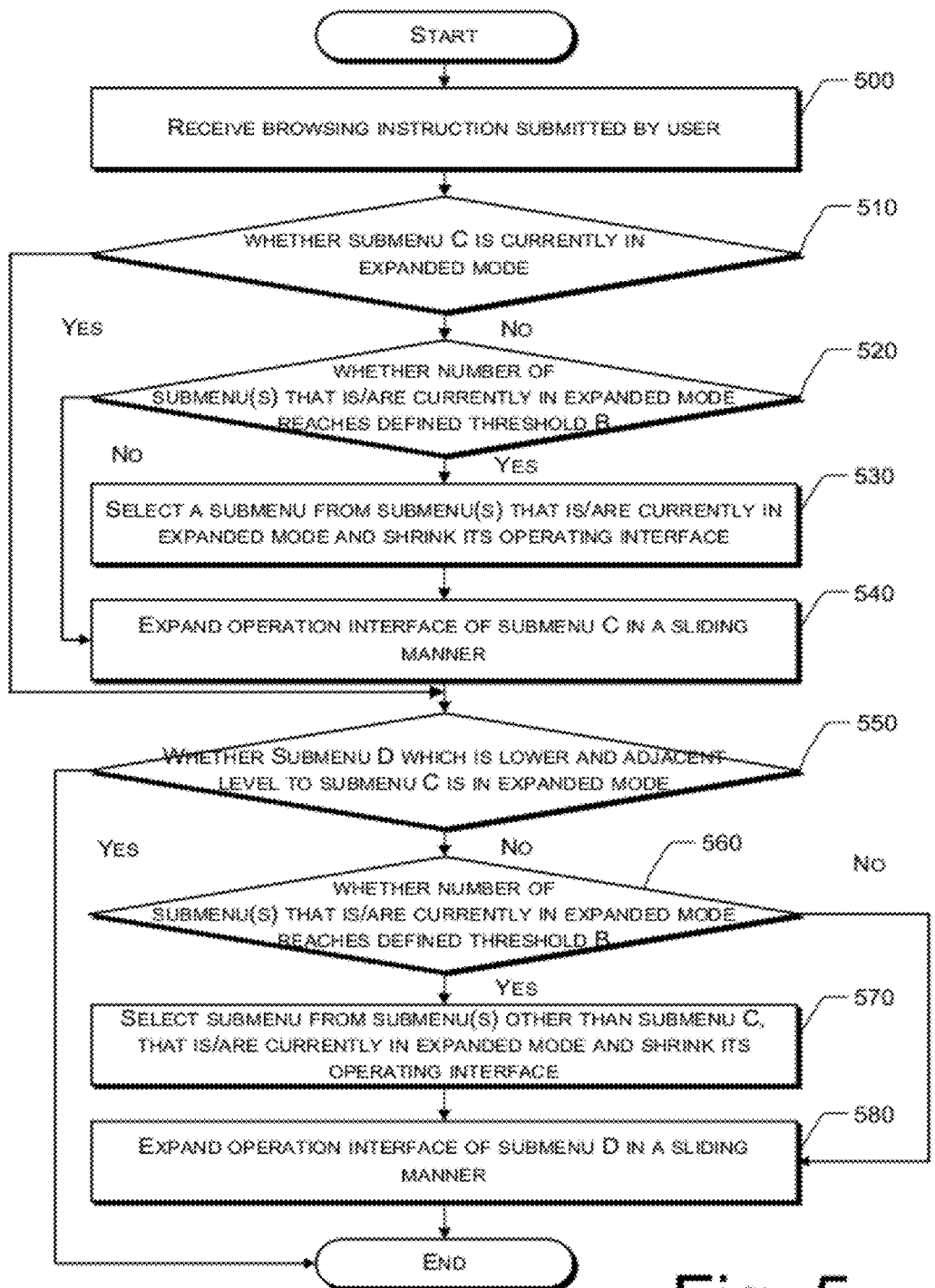
FIG. 5 shows an exemplary flow chart of adjusting various submenus in the cascading menu by the terminal apparatus based on a fixed length of an interface in accordance with the present disclosure.

Referring to FIG. 4, the present embodiment assumes that each level of submenu in a cascading menu is ranked in a descending order from high to low level as follows: a submenu A, a submenu B, a submenu C, a submenu D, a submenu E, and so forth. Referring to FIG. 5, which shows a flow chart of adjusting various levels of submenus in the cascading menu based on the fixed length of the operation interface in accordance with the present disclosure. Detailed operation of the process is described below.

At 500, a browsing instruction submitted by a user is received. The user can click to choose any level of submenu in the cascading menu through the operation interface to submit the browsing instruction. In the example shown, submenu C is assumed to be the one clicked by the user.

Figure 6:
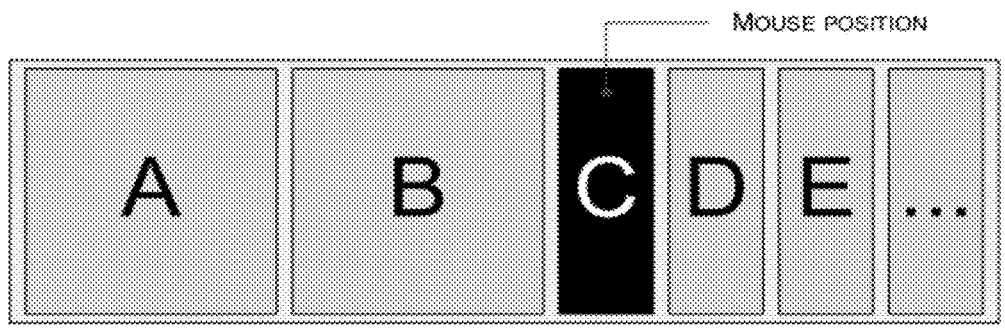
FIGS. 6-8 show schematic diagrams of operation interfaces of various submenus when adjusting the various submenus in the cascading menu upon a mouse clicking event in accordance with the present disclosure.

Referring to FIG. 6, the user can click an operation interface of submenu C to move a mouse over submenu C and trigger an "onmouseover" event, thus selecting submenu C to be the submenu currently browsed.

Referring back to FIG. 5, at 510, it is determined whether or not submenu C is currently in an expansion mode. If affirmative, the process proceeds to 550. Otherwise, the process continues to 520.

In this exemplary embodiment, in determining whether or not submenu C is currently in the expanded mode may employ, but not limited to, the following method: A width of the operation interface of submenu C is compared with a defined threshold A (e.g., a predetermined value of the width property parameter). If the comparison result is equal, then it is determined that the operation interface of submenu C is in the expansion mode. However, if the width is less than the defined threshold A, then it is determined that the operation interface of submenu C is not in the expanded mode.

At 520, a number of submenus that are currently in an expanded mode in the operation interface of the cascading menu is counted and compared with a defined threshold B to determine whether or not the counted number reaches the defined threshold B. If affirmative, the process continues to 530. Otherwise, the process proceeds to 540.

In one embodiment, the value of the defined threshold B is set to be two (the value of the threshold B is predetermined by management personnel according to maintenance experiences). Specifically, this indicates that at most two submenus in the operation interface of the cascading menu are allowed to be in the expanded mode. In practical applications, the value of the defined threshold B can also be adjusted according to a change in the size of the operation interface of the cascading menu. Respective details are not further described herein in the interest of brevity.

Alternatively, at 520, a total width of the submenus that are currently in the expanded mode is determined and compared with a defined threshold C to determine whether or not the total width reaches the defined threshold C. If affirmative, the process continues to 530. Otherwise, the process proceeds to 540. The threshold C is referred to as a maximum allowable width of the expanded menus in the operation interface of the cascading menu.

At 530, a submenu from the submenus that are currently in the expanded mode is selected, and its operation interface is shrunk.

In practical applications, operation interfaces of two, three or other number of submenus may be shrunk. The exemplary embodiments of the present disclosure select one for illustrative purpose only. At 530, in selecting a submenu to be shrunk may employ, but not limited to, the following method: Submenus that are in the expanded mode are identified according to an order from submenu A to submenu B, and the first submenu that is identified to be in the expanded mode is shrunk. If none is found, then submenus that are in the expanded mode are identified according to an order from submenu E to submenu D, and the first submenu that is identified to be in the expanded mode is shrunk.

Figure 7:
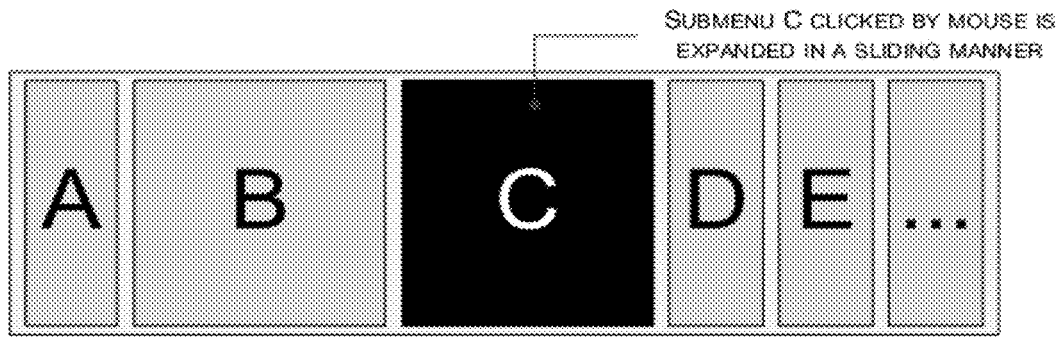

At 540, the operation interface of submenu C is expanded in a sliding manner with corresponding effect of operation as shown in FIG. 7.

At 550, it is determined whether or not submenu D, an immediate lower and adjacent level of submenu C, is in the expanded mode. If affirmative, the present process ends. Otherwise, the process continues to 560.

At 560, the number of submenus that are currently in the expanded mode in the operation interface of the cascading menu is counted and compared with the defined threshold B to determine whether or not the number reaches the defined threshold B. If affirmative, the process continues to 570. Otherwise, the process proceeds to 580.

At 570, a submenu (other than submenu C) is selected from the submenus that are currently in an expanded mode, and its operation interface is shrunk.

Similar to those actions taken at 530, in practical applications, operation interfaces of two, three or other number of submenus may be shrunk. The exemplary embodiments of the present disclosure select one for illustrative purpose only. The selecting of a submenu to be shrunk at 570 may employ, but not be limited to, following method: Submenus that are in an expanded mode is identified according to an order from submenu A to submenu B, and the first submenu that is identified to be in an expanded mode is shrunk. If none is identified, then submenus that are in an expanded mode are identified according to an order from submenu E to submenu D, and the first submenu that is identified to be in an expanded mode is shrunk. Alternatively, identifying submenus that are in an expanded mode may be performed in an order from submenu B to submenu C, in an order from submenu D to submenu E, or according to any other predetermined approach. Details are not further described herein in the interest of brevity.

Figure 8:
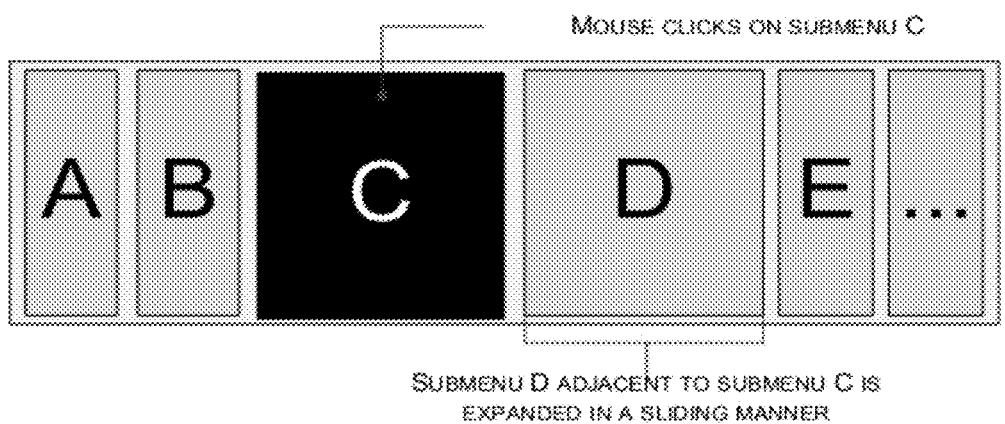

At 580, an operation interface of submenu D is expanded in a sliding manner with corresponding effect of operation shown in FIG. 8.

In the present embodiment, submenu C and submenu D are both expanded because reading habits of users are typically from left to right under normal circumstances. After finishing reading submenu C, the user normally moves his/her attention to submenu D. Therefore, submenu D needs to be expanded in order to maintain continuity of the line of sight of the user. As such, reading convenience of the cascading menu is effectively improved, thus the user experience is greatly improved.

Certainly, the number of submenus that are concurrently expanded by the apparatus in the operation interface of the cascading menu can be adjusted based on the size of the operation interface of the cascading menu. For example, during the actions taken at 500-570, if the size of the operation interface of the cascading menu is too small, the terminal apparatus may only expand submenu C that is currently clicked by the user but not submenu D. For another example, during the actions taken at 500-570, if the operation interface of the cascading menu is wide enough, the terminal apparatus may display submenu D and submenu E in the expanded mode while expanding submenu C. The present embodiment uses expansion of both submenu C and submenu D as a preferred embodiment for illustrative purpose only.

In practical applications, by studying mental models associated with operations of ordinary users, a research finds that users are more receptive to an operation mode of "what you see is what you get." A "what you get is what you see" target operation within a visible region enables the user to timely examine and modify an operation result. Therefore, the complexity associated with the process of operations is effectively reduced. This saves learning cost of the user, smoothes the process of user operations, and greatly reduces a sense of frustration which is resulted because of invalid operations of the user.

In the exemplary embodiments of the present disclosure, a terminal apparatus uses a fixed operation interface to display a cascading menu that includes a plurality of submenus to a user. When a user clicks on a certain submenu, the terminal apparatus determines, based on the clicking of the user, a first submenu that is indicated for browsing by the user. Upon determining that the operation interface of the first submenu is in a collapsed mode, the terminal apparatus counts the number of submenus that are currently in an expanded mode within the operation interface of the cascading menu. If it is determined that the number of submenus that are currently in the expanded mode reaches a defined threshold, the terminal apparatus, according to a predetermined method, selects at least a second submenu from the submenus that are currently in the expanded mode, shrinks the operation interface of the second submenu, and expands the operation interface of the first submenu in a sliding manner. Therefore, the size of the operation interface of the cascading menu will not increase as the number of the expanded submenus increases. As such, an amount of page space occupied by the cascading menu is reduced and the utilization of the page space is improved. Furthermore, when the user browses the various submenus, the mouse trajectory is also prevented from ever increasing. This allows the user to browse all submenus within the fixed operation interface and achieves an operating mode of "what you see is what you get", thereby facilitating user operations and browsing, smoothing the entire process of operations and greatly improving user experience.

One skilled in the art can alter or modify the present disclosure in many different ways without departing from the spirit and the scope of this disclosure. Accordingly, it is intended that the present disclosure covers all modifications and variations which fall within the scope of the claims of the present disclosure and their equivalents.

What is claimed is:

1. A method comprising:
   displaying operating interfaces of a plurality of submenus in a cascading menu, the plurality of submenus comprising at least a first submenu;
   determining that the first submenu is selected by a user based at least in part on a clicking event of the user;
   selecting at least a second submenu from submenus currently in an expanded mode to shrink an operation interface of the at least second submenu based at least in part on an operation interface of the first submenu being in a collapsed mode, selecting the at least second submenu comprising:
      selecting a currently expanded submenu having a level that is highest from one or more submenus that are located at levels higher than the first submenu to be the at least second submenu in response to determining that the one or more submenus that are located at the levels higher than the first submenu are currently in the expanded mode; and
      selecting a currently expanded submenu having a level that is lowest from one or more submenus that are located at levels lower than the first submenu to be the second submenu in response to determining that no submenu that is located at a level higher than the first submenu is currently in the expanded mode;
   expanding the operation interface of the first submenu after the operation interface of the at least second submenu is shrunk;
   determining whether to expand an operation interface of a third submenu which is adjacent to the first submenu and located at a level lower than the first submenu based on a size of an operation interface of the cascading menu in response to the operation interface of a third submenu being in the collapsed mode;
   expanding the operation interface of the third submenu;
   counting a number of submenus that are currently in the collapsed mode; and
   selecting at least a fourth submenu from the submenus that are currently in the expanded mode to shrink an operation interface of the fourth submenu when the number of submenus that are currently in the expanded mode reaches a predetermined threshold.

2. The method as recited in claim 1, further comprising:
   measuring a size of the operation interface of the first submenu;
   comparing the measured size of the operation interface with a predetermined threshold; and
   determining that the operation interface of the first submenu is in the collapsed mode when the measured size of the operation interface of the first submenu is less than the predetermined threshold.

3. The method as recited in claim 1, further comprising expanding the operation interface of the first submenu when a number of submenus currently in the expanded mode does not reach a predetermined threshold.

4. The method as recited in claim 1, further comprising measuring sizes of operation interfaces of submenus other than the first submenu to identify any operation interface of the submenus other than the first submenu to be in the expanded mode.

5. The method as recited in claim 1, further comprising:
   counting a number of submenus that are currently in the expanded mode within the operation interface of the cascading menu; and
   comparing the number of submenus that are currently in the expanded mode with a predetermined threshold to obtain a comparison result, wherein expanding the operation interface of the first submenu comprises expanding the operation interface of the first submenu when the number of submenus that are currently in the expanded mode does not reach the predetermined threshold based at least in part on the comparison result.

6. The method as recited in claim 1, further comprising determining a number of submenus to be concurrently expanded with the first submenu based on a size of an operating interface of the cascading menu including the plurality of submenus.

* * * * *